March 2, 1971  W. W. PAULSON  3,567,291

ENDLESS TRACK CONNECTING STRUCTURE

Filed April 21, 1969  2 Sheets-Sheet 1

INVENTOR.
WILLIAM W. PAULSON
BY
ATTORNEYS

March 2, 1971     W. W. PAULSON     3,567,291
ENDLESS TRACK CONNECTING STRUCTURE
Filed April 21, 1969     2 Sheets-Sheet 2
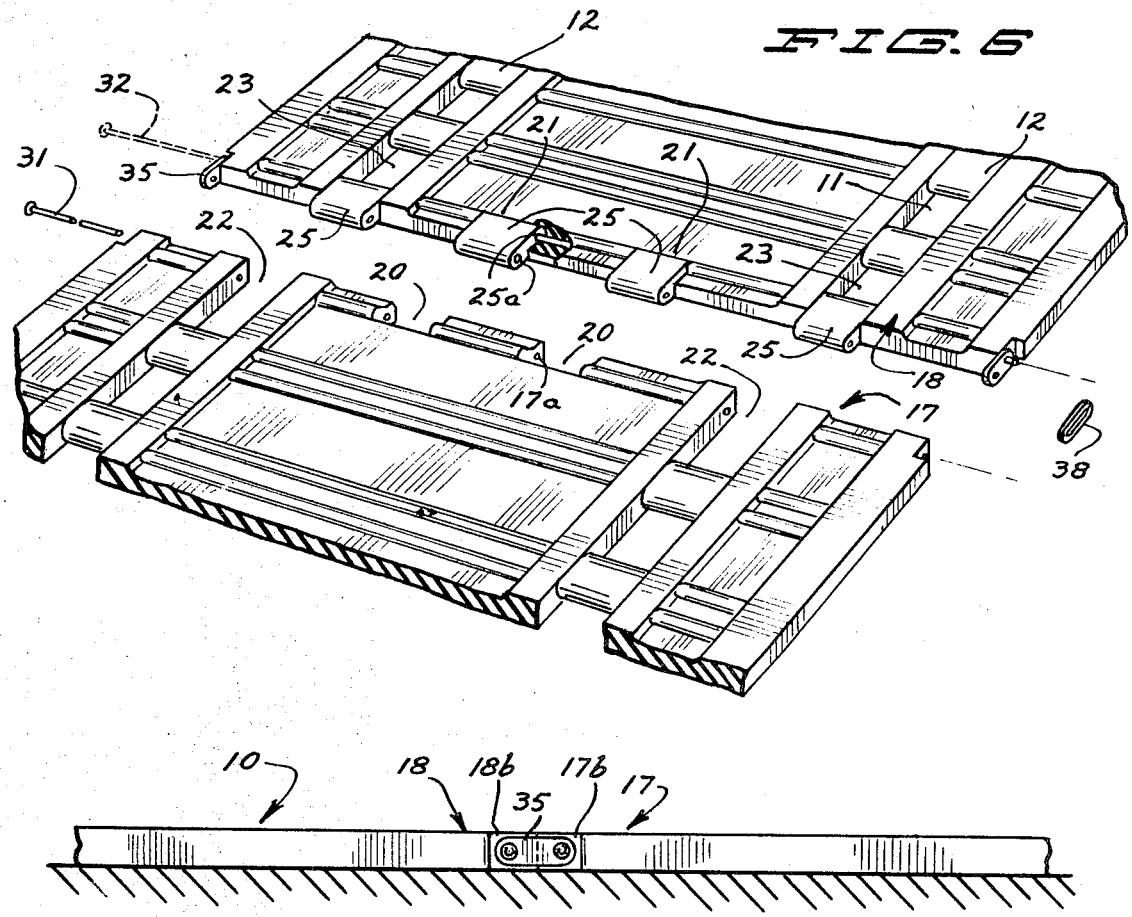
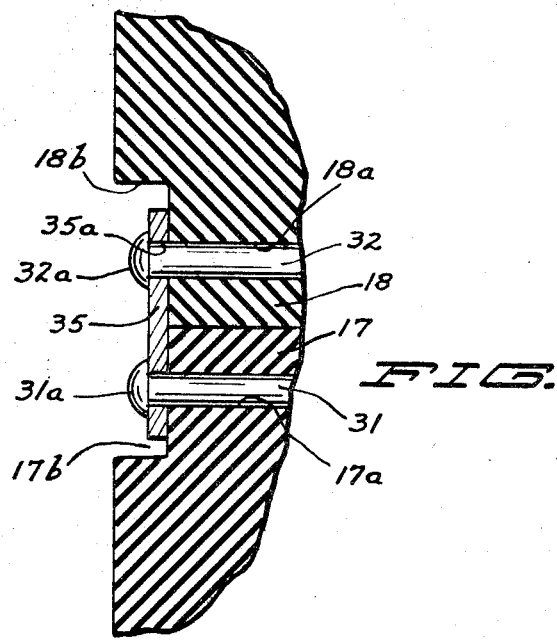
INVENTOR.
WILLIAM W. PAULSON
BY
ATTORNEYS

United States Patent Office 3,567,291
Patented Mar. 2, 1971

3,567,291
ENDLESS TRACK CONNECTING STRUCTURE
William W. Paulson, Braham, Minn., assignor to Dahlman Manufacturing & Sales, Inc., Braham, Minn.
Filed Apr. 21, 1969, Ser. No. 817,884
Int. Cl. B62d 55/24
U.S. Cl. 305—37                                        2 Claims

ABSTRACT OF THE DISCLOSURE

A separable endless track for a motor vehicle comprising a body portion having a pair of opposed free end portions, a plurality of link members, said free end portions respectively having aligned recessed portions to receive said links therein therebetween and to permit said free end portions to abut one another, said end portions and said links respectively being apertured transversely of said track to receive rods therethrough to join said end portions by means of said links and said links conforming in thickness to said recessed portions.

BACKGROUND AND SUMMARY OF THE INVENTION

The subject matter of the invention herein is related particularly to use in connection with a type of motor vehicle commonly known as a snowmobile. The vehicle is moved by means of a sprocket driven endless track. The track members are frequently broken and require replacement. The track members conventionally are formed of integral construction and must be mounted onto the vehicle as an endless member in replacing a broken track. This represents an arduous task. The subject matter of the invention herein comprises an endless track having a connecting linkage therein providing in effect an endless structure equivalent to an integral endless track. The structure disclosed herein represents an improvement over the "Endless Track" set forth in my application for U.S. Letters Patent, S.N. 757,826, filed Sept. 6, 1968 now Pat. No. 3,508,796.

Generally stated, the invention herein comprises a separable endless track wherein abutting free end portions have aligned pairs of recesses or notches therein whereby a plurality of link members are respectively disposed into pairs of said recesses and said ends and said links are apertured to respectively receive a rod therethrough transversely of said track wherein very readily said track is formed into an endless track having the strength and operating characteristics of an integral endless track.

It is an object of this invention to provide a separable endless track which may be readily mounted onto a vehicle and connected therein.

It is another object of this invention to provide readily applied connecting means for a separable endless track, which means do not interrupt the uniformity of, nor the continuity of construction of the track.

These and other objects and advantages of the invention will be set forth in the following description made in connection with the accompanying drawings in which like reference characters refer to similar parts throughout the several views and in which:

FIG. 6 is a broken exploded view in perspective;

FIG. 7 is a broken view in end elevation taken on line 7—7 of FIG. 1 as indicated; and FIG. 8 is an enlarged broken view in horizontal section taken on line 8—8 of FIG. 2 as indicated.

DESCRIPTION OF A PREFERRED EMBODIMENT

Figure 1:
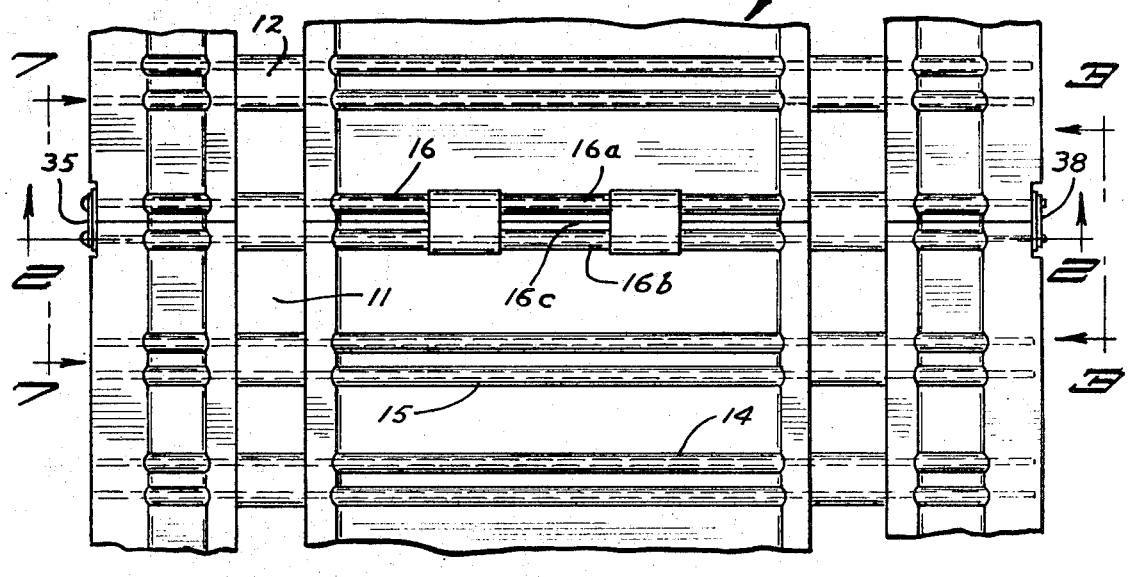
FIG. 1 is a broken plan view showing the connected portion of the track structure herein.
Figure 2:
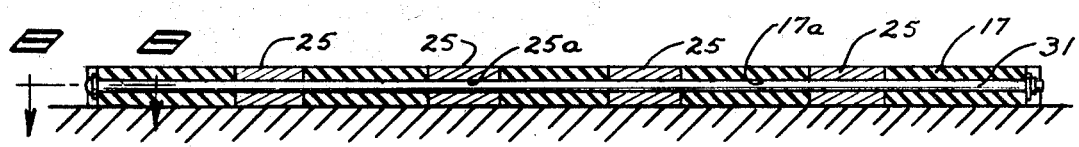
FIG. 2 is a view in vertical cross section taken on line 2—2 of FIG. 1 as indicated.
Figure 3:
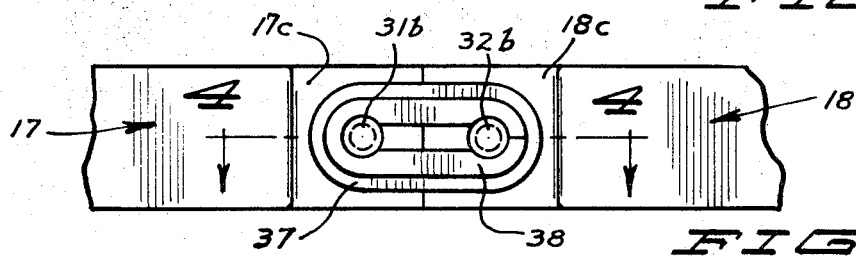
FIG. 3 is a broken view in end elevation on an enlarged scale taken on line 3—3 of FIG. 2 as indicated.
Figure 4:
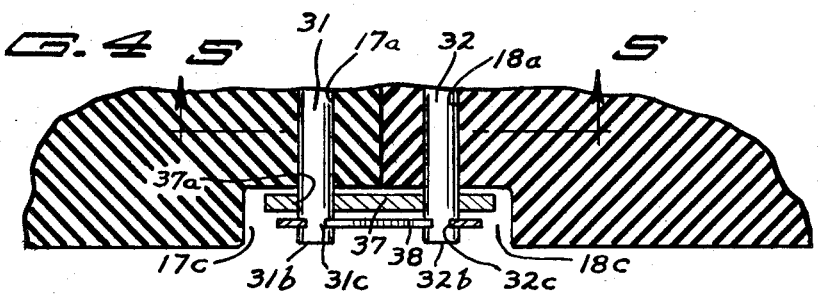
FIG. 4 is a broken view in horizontal section taken on line 4—4 of FIG. 3 as indicated.
Figure 5:
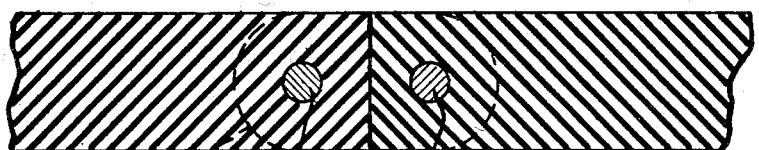
FIG. 5 is a broken view in vertical section taken on line 5—5 of FIG. 4 as indicated.

Referring to the drawings, a member 10 comprising a track for supporting and moving a snowmobile is shown. The particular track member illustrated herein is described in detail in my above indicated patent application. For purpose of description herein, said track includes sprocket channels 11 having therein longitudinally spaced sprocket engaged driving members 12. Spaced along said track transversely thereof are rib members 14, 15, 16 and the like.

The track structure herein is severed or separated transversely through the center of one of the ribs such as rib 16. It will be noted that the ribs are formed of a pair of spherical portions 16a and 16b having a narrow connecting web 16c therebetween. The track is separated along said web 16c to form free end track portions 17 and 18. Said end portions mate in abutting relationship to provide uninterrupted continuity in the longitudinal and transverse sectional configuration of the track.

Said free end portions having a plurality of pairs of aligned recesses therein indicated by the reference numerals 20–21 and 22–23. Said recesses 22–23 are within the sprocket channels 11. Disposed within said pairs of aligned recesses are link members 25 of identical structure and preferably formed of suitable metal and are substantially elliptical in longitudinal section. Said link members conform substantially to the thickness of said end portions of said track at said recesses.

Running through said links transversely of said track member are pairs of spaced holes or apertures 25a as indicated. Running through said end portions 17 and 18 are holes or apertures 17a and 18a arranged to be respectively aligned with said holes 25a when said links 25 are in connecting position.

Rods 31 and 32 are provided to be disposed through said holes 17a and 18a and the corresponding holes 25a of said link members 25. Said rods each have flattened enlarged head portions 31a and 32a at one end adapted to retain the plate member 35 having spaced apertures 35a to receive said rods and hold the same in spaced relation. Said plate member will be received in recesses 17b and 18b as indicated in FIG. 8, to be flush with the adjacent side wall of the track.

The other end portions of said rods 31b and 32b extend through said track into recesses 17c and 18c corresponding to said recesses 17b and 18b. Disposed in said recesses 17c and 18c is a plate member 37 recessed as at 37a to receive the adjacent end portions 31b and 32b of said rods, which end portions respectively have annular grooves 31c and 32c. Disposed about said end portions of said rods and seated in said grooves is a conventional split resilient locking ring 38 to releasingly lock said rods against movement transversely.

OPERATION

A conventional endless track for a snowmobile is of integral construction and is not subject to being disconnected or separated at some point thereon for removal from an operating position or for installation as for replacement. The removal or installation of an integral endless track is an arduous and time consuming task.

The structure herein provides a linkage for the separation of a track without weakening the structure of the track and provides for substantially the uninterrupted continuity of the track configuration.

The rod 32 will be disposed through the aperture 18a of the track and the corresponding apertures of the links 25, as indicated as in FIG. 6. The sprockets of the snowmobile which drive the track and over which the track passes will be loosened to somewhat shorten the distance therebetween. One free end of the belt will be passed over and moved over the sprockets and advanced to a position adjacent the other free end of the track. This is accomplished within but a few moments. With the sprockets loosened, the track ends are readily held together and the links 25 will be positioned within the recesses 20 and 22 so that the apertures 17a through said other end of said track will be aligned with the corresponding apertures or holes running through the links 25. The rod 31 will then be disposed through the apertures 17a and the corresponding apertures through the links to join the free ends of the track. The ends of the rods 31 and 32 which pass through the track also pass through the connecting plate member 37 and are secured against axial movement by the split locking ring 38. Thus the track is connected within a few moments. The sprockets are tightened to provide the desirable tension on the track and the snowmobile is back in operating position.

The connecting linkage herein disclosed may seem to be quite obvious from the point of simplicity, but this represents a substantial improvement in the art of track structures for snowmobiles and has been exceedingly well received commercially.

What is claimed is:

1. A separable track for a snowmobile having in combination:
    a track member having a pair of free ends, said ends being aligned and constructed to meet in abutting relation,
    a plurality of pairs of opposed recesses formed in said ends,
    link members respectively disposed within said pairs of recesses,
    said ends respectively having apertures extending therethrough transversely of said track member,
    said links having apertures therethrough in alignment with said apertures through said ends,
    rods respectively disposed through said apertures and said ends and said links to connect said ends,
    said rods having ends extending outwardly of each side of said track,
    said rods each having at least at one end thereof an annular groove spaced inwardly of the ends thereof, and
    locking means receiving said grooved ends of said rods and engaging said grooves to secure said rods.
2. The structure set forth in claim 1, wherein:
    said locking means as portions thereof disposable within said grooves have locking engagement therewith.

References Cited

UNITED STATES PATENTS

| | | | |
|---|---|---|---|
| 663,967 | 12/1900 | Hubbell | 24—38 |
| 2,402,042 | 6/1946 | Haushalter | 305—37 |
| 3,285,676 | 11/1966 | Hetteen | 305—38 |

FOREIGN PATENTS

| | | | |
|---|---|---|---|
| 726,411 | 1/1966 | Canada | 74—231(J) |

RICHARD J. JOHNSON, Primary Examiner

U.S. Cl. X.R.

305—38